United States Patent Office 3,100,754
Patented Aug. 13, 1963

3,100,754
POTENTIALLY REACTIVE UREA-FORMALDE-
HYDE ADHESIVE SYSTEM
Clifford C. Booth and Robert B. Dean, Bainbridge, N.Y., assignors to The Borden Company, a corporation of New Jersey
No Drawing. Filed May 23, 1958, Ser. No. 737,224
2 Claims. (Cl. 260—29.4)

This invention relates to an adhesive for bonding wood and other materials under heat and pressure. The invention is particularly useful as the adhesive in plywood and will be illustrated by description in connection with such use.

In the plywood industry, there have been used or proposed urea formaldehyde resins with literally dozens of hardeners for the resin. The effort still continues, however, to speed up the hardening of the resin during the compositing of the plywood, without causing the adhesive, as prepared for use, to set up in an undesirably short time in storage or in the glue pot.

The present invention provides an adhesive composition for plywood, sawdust, shavings, or the like that is faster in rate of hardening at the hot-press temperatures than compositions heretofore known and that has good pot life at temperatures of holding in mixed form before use. It provides a special catalyst or hardener that actually gives slower cure in the adhesive, when held at ordinary temperature before use, with larger proportions of admixed catalyst above a certain minimum amount than with a smaller amount. Thus the useful pot life of a representative urea formaldehyde resin, with 10% of our hardener on the weight of resin, was 6–8 hours in each of five tests at 90° F. as compared to 4–7 hours with 7.5% of the hardener.

The gel time of our compositions at hot-press temperature varied, with typical preparations, from 0.89–1.37 minutes, whereas the gel time at 90° F. varied from 295–780 minutes for the same compositions.

Briefly stated, the invention comprises an adhesive composition containing an aminoplast resin such as the condensation product of formaldehyde with urea or melamine or a mixture thereof and hardener for the aminoplast, the hardener including a mixture of ammonium nitrate, urea, and ammonium hydroxide.

We attribute the combination of the high rate of cure of the resin composition at the temperature of 212° F. or so with the slow cure at pot temperatures in part to the action of the ammonium nitrate, in association with other components of the formula, in becoming a powerful accelerator only at elevated temperatures.

As the aminoplast resin, we use to advantage a thermosetting water-soluble condensation product of 1 mole of urea with 1.6–2.5 moles of formaldehyde and ordinarily 1 urea to 2 formaldehyde, condensed in a usual manner as in contact with an acid catalyst. Melamine may be used to replace all or part of the urea used in making the resin, with results that are acceptable even if somewhat less satisfactory than with all urea. The substitution is made on an equivalent basis, that is, about 1 mole of melamine for 3 of urea. The resin, in any case, is ordinarily used in the form of a solution that for purposes of economy and effectiveness should be concentrated to 50%–65% concentration or so and usually to about 65%. The result may also be introduced in the form of a powder made by spray or otherwise drying the solution, the powder being dissolved in a suitable quantity of water before use as an adhesive.

The materials that compose the hardener are any agricultural or other commercial grades of such materials.

In addition there may be used conventional extenders, fillers, and the like of kind and in proportion that are usual in such adhesives. Thus we obtain particularly satisfactory results when we use nutshell flour (walnut, pecan, or cashew) as an agent to control penetration and a cereal flour such as wheat, rye or cornflour as an extender of the adhesive.

To obtain the very rapid hot-press hardening and yet retain a satisfactory long pot life of the adhesive, we work within certain proportions. Thus we use the water in about the minimum proportion to dissolve the other components of the adhesive, as, for example, 50–65 parts for 100 parts of dry solids in the adhesive.

Proportions here and elsewhere herein are expressed as parts by weight unless specifically stated to the contrary.

It is frequently desirable to introduce a part of this water in the form of a solvent for the resin and a further part as a solvent for the hardener, as up to 20 parts. We have found that the hardener composition will remain in complete solution down to 20° F. if 10 parts of water are used for 100 parts of other ingredients of the hardener. Less water may be used if the hardener is maintained at higher temperatures and as little as 3 parts may be effective if the temperature is maintained above 70° F. Less than 3 parts of water gives a composition which has an objectionably high vapor pressure of ammonia.

The water content of the final adhesive may, however, be increased very greatly above the 60 parts that we ordinarily use per 100 parts resin solids, the increase being more or less in proportion to the amount of the cereal flour added. The more of such flour used, the greater the thickening effect and the larger the amount of water that may be used, up to 1–1.25 parts for each part of flour introduced.

The proportion of the flour is ordinarily 5–100 parts for 100 of the resin.

For the hardener itself, calculated on the dry basis, we use about 10–50 parts of urea, 2.5–11 of ammonium hydroxide calculated as ammonia, and ammonium nitrate in amount to make 100 parts total weight of the hardener on the dry basis. Particularly satisfactory results are obtained when the proportion of urea is 30–50 parts and the ammonia is 6–9 parts. In representative compositions, the ammonium nitrate runs around 40–60 parts for 100 total dry weight of the hardener.

Suitable proportions of the hardener mixture, on the dry basis, are 7–23 parts for 100 of the resin.

Representative proportions of the resin, hardener, wheat flour, and water to be used are as follows:

| Component | Parts by Weight | | | | |
|---|---|---|---|---|---|
| Resin (65% sol.) | 100 | 100 | 100 | 100 | 100 |
| Hardener | 10 | 10 | 10 | 10 | 10 |
| Flour | ¹10 | 10 | 25 | 50 | 75 | 100 |
| Water added | 0 | 20 | 50 | 80 | 115 |

¹ In this case, the flour was walnut shell flour. In all formulas, the water added is in addition to that supplied in the resin and ammonia solution.

The materials are mixed in a usual manner. A suitable sequence of addition being the order in which the several components are listed in the table of Examples 1–3.

The invention will be further illustrated by detailed description in connection with the following specific examples of the practice of it.

*Examples 1–3*

In each of these Examples 1–3, the urea formaldehyde resin was an acid catalyzed condensation product made from 1 mole of urea to 2 moles of formaldehyde with formic acid as catalyst. The resulting solution was concentrated by evaporation under vacuum to a solution of 65% solids content. This was then mixed with the other components in the order shown.

The table shows, in the last two lines, the minutes of pot life before the composition so made gels at 90° F. and the short time required, on the other hand, for hardening at hot-press temperatures such as 212° F. All of the compositions were of acceptable stability in storage or pot life and very fast in speed of cure in hot-pressing plywood.

| Component of Adhesive | Proportions in Example No.— | | |
|---|---|---|---|
| | 1 | 2 | 3 |
| Urea-formaldehyde resin (wt. of 65% sol.) | 100 | 100 | 100 |
| Wheat flour | 5 | | |
| Nut shell flour | 10 | | |
| Ammonium hydroxide, 28% sol | 1.8 | 1.0 | 1.9 |
| Ammonium nitrate | 4.0 | 4.5 | 4.5 |
| Urea | 3.2 | 3.6 | 3.6 |
| Water, additional | 1.0 | 0.9 | |
| Gel time of product | | | |
| At 90° F., min | 300 | 295 | 600 |
| At 212° F., min | 1.0 | 0.89 | 1.23 |

The contrast between the results with our adhesive composition and other hot-press adhesives proposed heretofore and using, in the hardener composition, various salts outside this invention is shown in the following table.

| Component of Conventional Adhesive | Proportions in Composition | | |
|---|---|---|---|
| | A | B | C |
| Urea formaldehyde resin (wt. of 65% sol.) | 100 | 100 | 100 |
| Ammonium hydroxide, 28% sol | 2.16 | 1.62 | |
| Ammonium chloride | | 0.84 | 1.64 |
| Ammonium sulfate | 0.72 | | |
| Ammonium thiocyanate | 0.48 | | |
| Urea | 0.78 | | 0.82 |
| Water, additional | 1.86 | 3.18 | 5.09 |
| Sodium bisulfite | | 0.36 | |
| Hexamethylenetetramine | | | 2.45 |
| Gel time of product: | | | |
| At 90° F., min | 720 | 360 | 510 |
| At 212° F., min | 2.42 | 2.00 | 2.22 |

The conventional compositions, although appearing somewhat similar to applicants', required on the average 2.21 minutes of cure (gel time) at the temperature of 212° F. as compared to the average 1.04 minutes for Examples 1–3.

*Example 4*

The composition of Example 1 was spread on 3 plies of 1/16 inch poplar veneers and hot-pressed in conventional fashion for a period of 1.5 minutes. The product was a firmly bonded sheet of plywood.

*Example 5*

A wood particle board was made by spraying on 100 parts of hammer-milled hardwood splinters, 10 parts of the urea formaldehyde adhesive composition of Example 3. After thorough mixing of the splinters and adhesive, the mix was loaded into a rectangular form and compressed to a mat about 1.5 inches thick. This mat was then compressed between aluminum cauls in a hot press at 325° F. to a thickness of 0.75 inch for a period of 7 minutes to produce a high quality particle board suitable for use in furniture, interior partitions, and the like.

*Example 6*

The procedure and formula of any of the Examples 1–5 are followed except that about one-third mole of melamine is substituted for the 1 mole of urea.

In a modification of this example, one-quarter mole of melamine is substituted for the mole of urea.

*Example 7*

The procedure and formula of any of the Examples 1–3 are followed except that the mole of urea there used is replaced by a mixture of 0.5 mole of urea with 0.1–0.2 mole of melamine.

It is to be understood that it is intended to cover all changes and modifications of the examples of the invention herein chosen for the purpose of illustration which do not constitute departures from the spirit and scope of the invention.

We claim:

1. An adhesive composition for bonding wood under heat and pressure comprising a thermosetting water soluble aminoplast resin, which is a condensation product of 1.6–2.5 moles of formaldehyde with a material selected from the group consisting of (1) 1 mole of urea, (2) 0.1 mole of melamine, and (3) mixtures thereof, a hardener therefor in the proportion of about 7–23 parts for 100 parts dry weight of the resin, the hardener consisting essentially of approximately 10%–50% of urea, 2.5%–11% of ammonia in aqueous solution and ammonium nitrate in amount to make the total 100%, and water, the total water content being adequate to dissolve the said resin and hardener.

2. The adhesive composition of claim 1, the said material being 1 mole of urea.

References Cited in the file of this patent

UNITED STATES PATENTS

| 2,193,630 | Howald | Mar. 12, 1940 |
| 2,236,184 | Menger | Mar. 25, 1941 |
| 2,385,560 | Wise | Sept. 25, 1945 |

OTHER REFERENCES

Ellis: "Chemistry of Synthetic Resins," Reinhold Publishing Corp., New York (1935), pages 618, 619 and 631.

UNITED STATES PATENT OFFICE
CERTIFICATE OF CORRECTION

Patent No. 3,100,754                                        August 13, 1963

Clifford C. Booth et al.

It is hereby certified that error appears in the above numbered patent requiring correction and that the said Letters Patent should read as corrected below.

Column 1, line 66, for "result" read -- resin --.

Signed and sealed this 23rd day of June 1964.

(SEAL)
Attest:

ERNEST W. SWIDER
Attesting Officer

EDWARD J. BRENNER
Commissioner of Patents